No. 820,243. PATENTED MAY 8, 1906.
W. McMURRAY.
MACHINE FOR FEEDING AND DRIVING STAPLES.
APPLICATION FILED MAY 26, 1902.

6 SHEETS—SHEET 1.

WITNESSES:
Geo. Hamann
[signature]

INVENTOR
William McMurray
BY
Clyde C. Balderston
ATTORNEY

No. 820,243. PATENTED MAY 8, 1906.
W. McMURRAY.
MACHINE FOR FEEDING AND DRIVING STAPLES.
APPLICATION FILED MAY 26, 1902.

6 SHEETS—SHEET 2.

WITNESSES:

INVENTOR
William McMurray
BY
Clyde P. Balsley
ATTORNEY

No. 820,243. PATENTED MAY 8, 1906.
W. McMURRAY.
MACHINE FOR FEEDING AND DRIVING STAPLES.
APPLICATION FILED MAY 26, 1902.
6 SHEETS—SHEET 3.
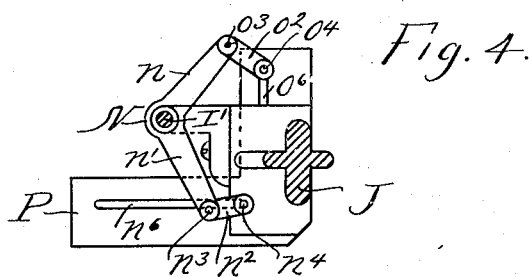
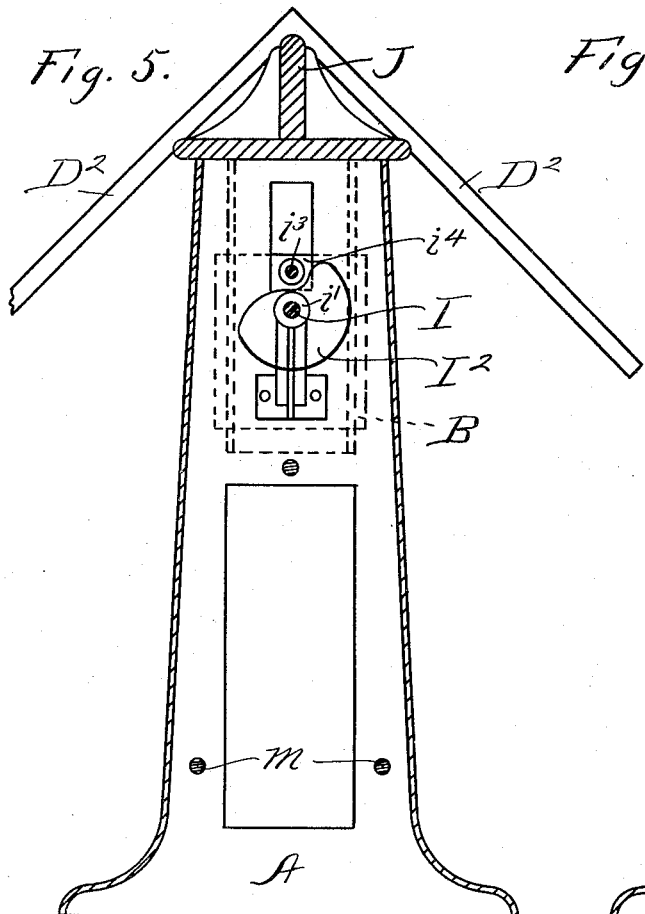
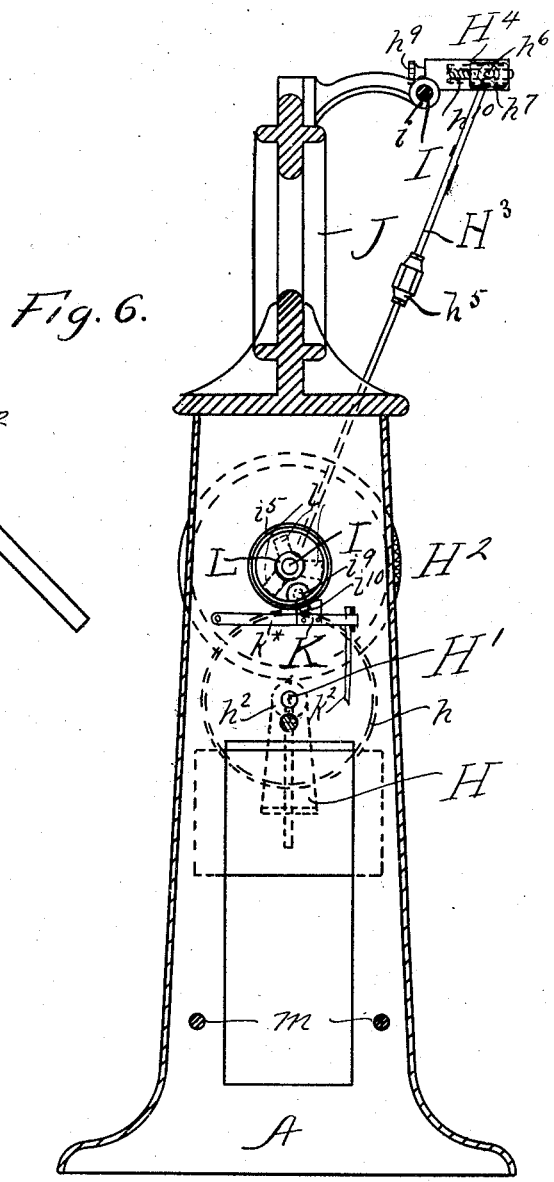

No. 820,243. PATENTED MAY 8, 1906.
W. McMURRAY.
MACHINE FOR FEEDING AND DRIVING STAPLES.
APPLICATION FILED MAY 26, 1902.
6 SHEETS—SHEET 4.
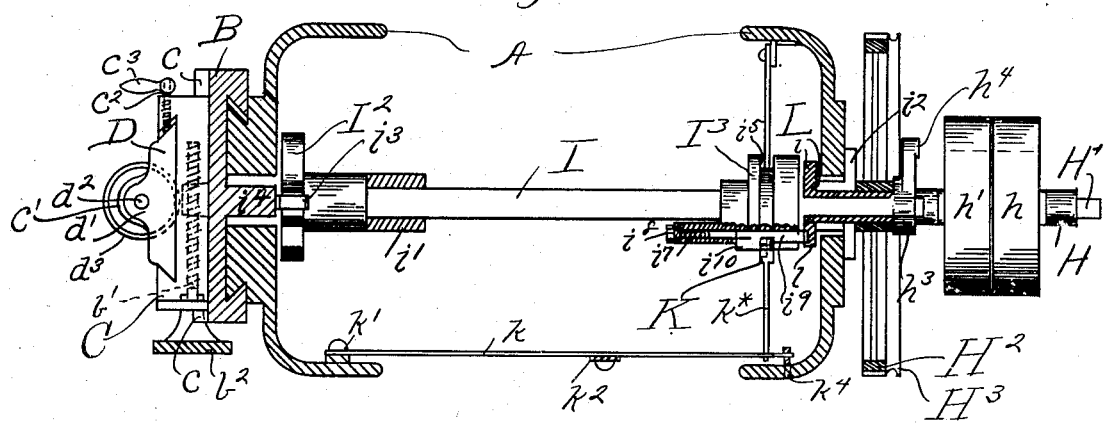
WITNESSES:
INVENTOR
William McMurray
BY
Clyde C. Bakstrong
ATTORNEY No. 820,243.                                           PATENTED MAY 8, 1906.
W. McMURRAY.
MACHINE FOR FEEDING AND DRIVING STAPLES.
APPLICATION FILED MAY 26, 1902.
6 SHEETS—SHEET 5.
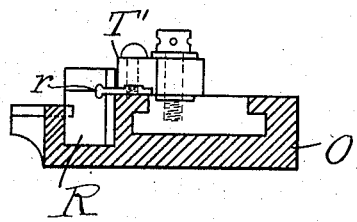
Fig. 11.
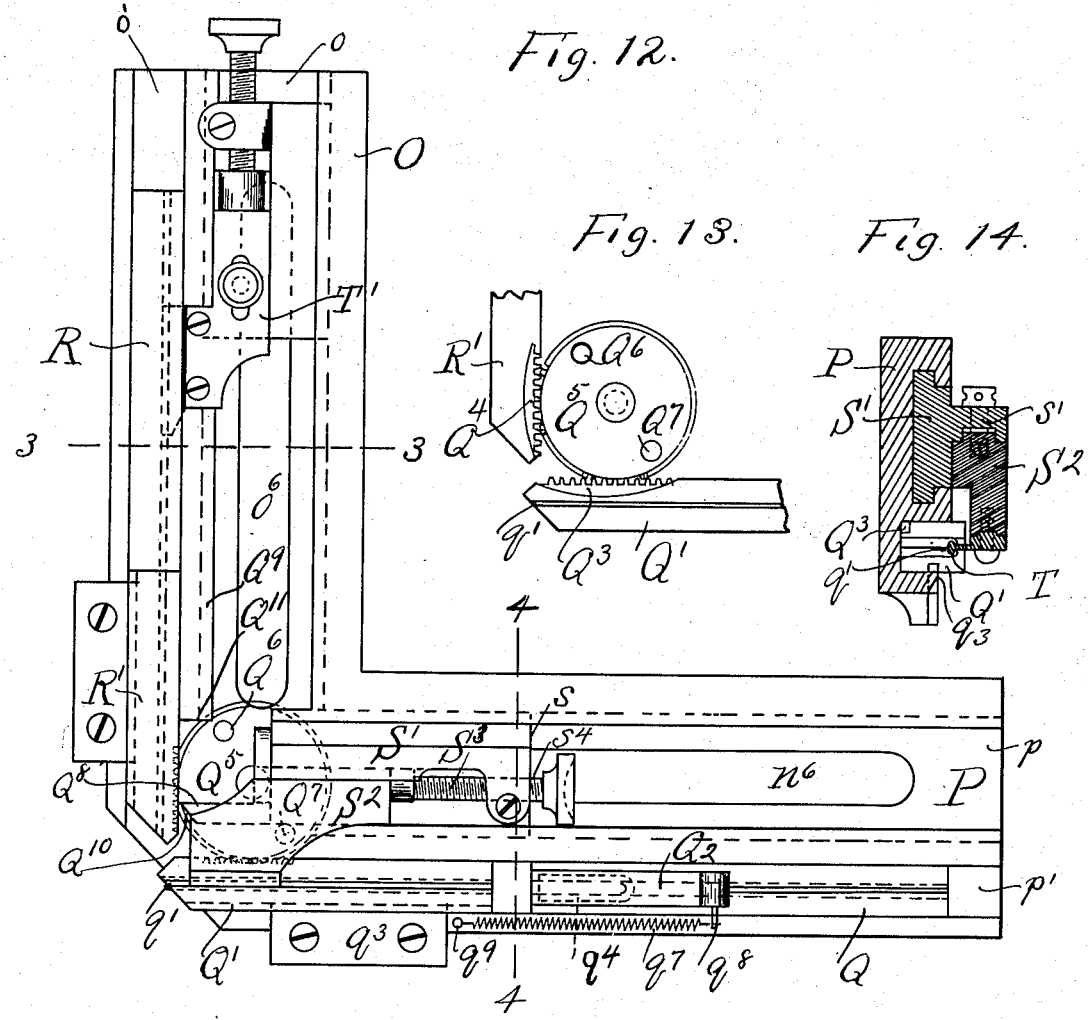
WITNESSES:                                                  INVENTOR
                                                        William McMurray
                                                              BY
                                                        Clyde C. Bolster
                                                           ATTORNEY No. 820,243. PATENTED MAY 8, 1906.
W. McMURRAY.
MACHINE FOR FEEDING AND DRIVING STAPLES.
APPLICATION FILED MAY 26, 1902.
6 SHEETS—SHEET 6.
Fig. 16.
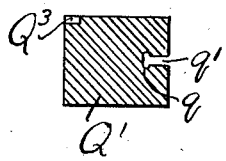
Fig. 17.
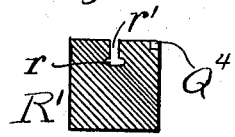
Fig. 18.
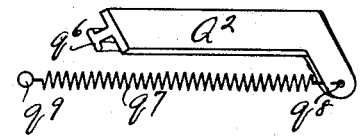
Fig. 15.
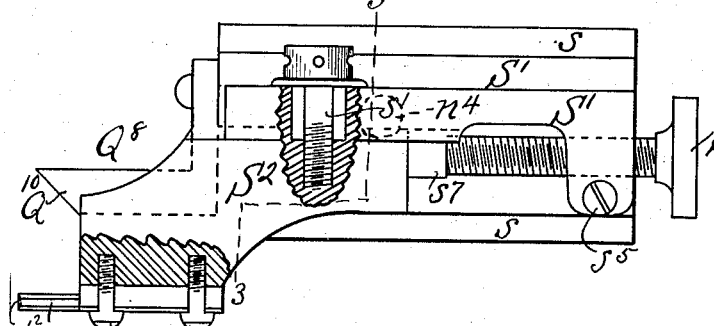
Fig. 19.
Fig. 20.
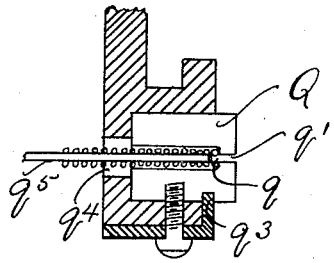
Fig. 21.
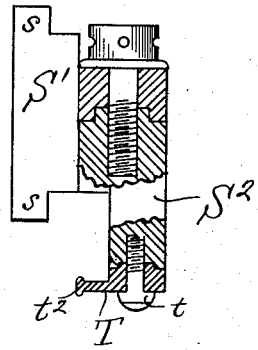
Fig. 22.
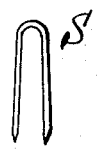
Fig. 23.
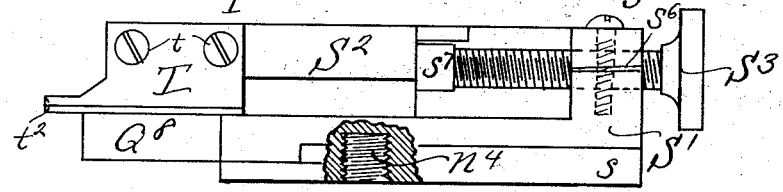
Fig. 24.
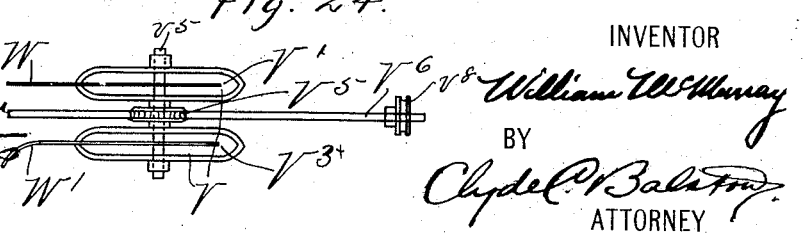
WITNESSES:
Geo. Hamann
[signature]
INVENTOR
William McMurray
BY
Clyde P. V. Balstrum
ATTORNEY

UNITED STATES PATENT OFFICE.

WILLIAM McMURRAY, OF NEW YORK, N. Y., ASSIGNOR TO WILLIAMS WIRE-HINGING MACHINE COMPANY, A CORPORATION OF NEW YORK.

MACHINE FOR FEEDING AND DRIVING STAPLES.

No. 820,243.   Specification of Letters Patent.   Patented May 8, 1906.

Application filed May 26, 1902. Serial No. 109,054.

*To all whom it may concern:*

Be it known that I, WILLIAM McMURRAY, a citizen of the United States, and a resident of New York, in the county of New York and State of New York, have invented certain new and useful Improvements in Machines for Feeding and Driving Staples, of which the following is a specification.

The object of this invention is to provide a machine capable of hinging covers upon boxes or hinging two boards or the like together generally by means of interlocked staples; and the invention comprises the novel details of improvements hereinafter more fully set forth and then pointed out in the claims.

Reference is to be had to the accompanying drawings, forming part hereof, wherein—

Figure 1:
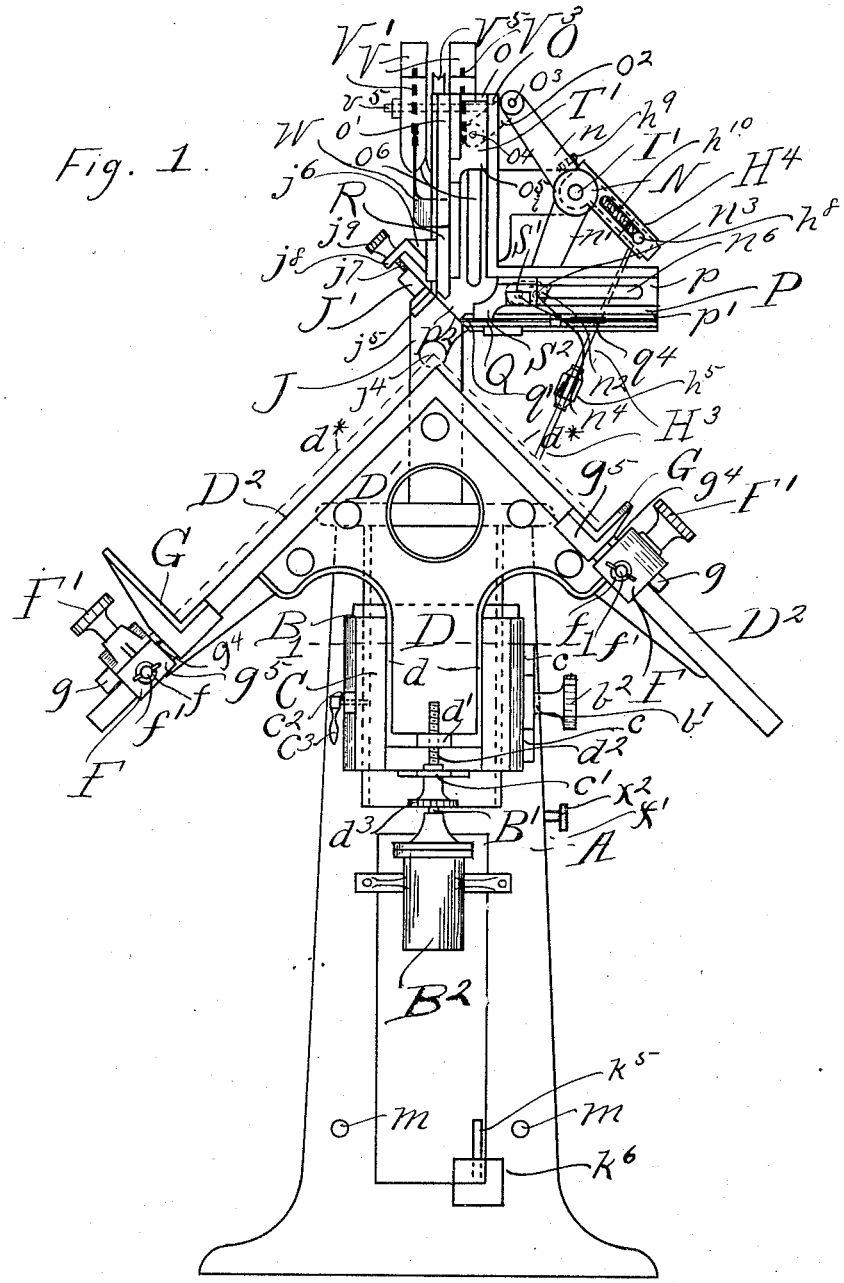
Figure 25:
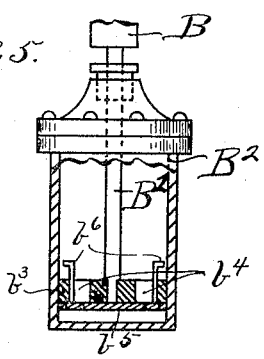
Figures 2, 3:
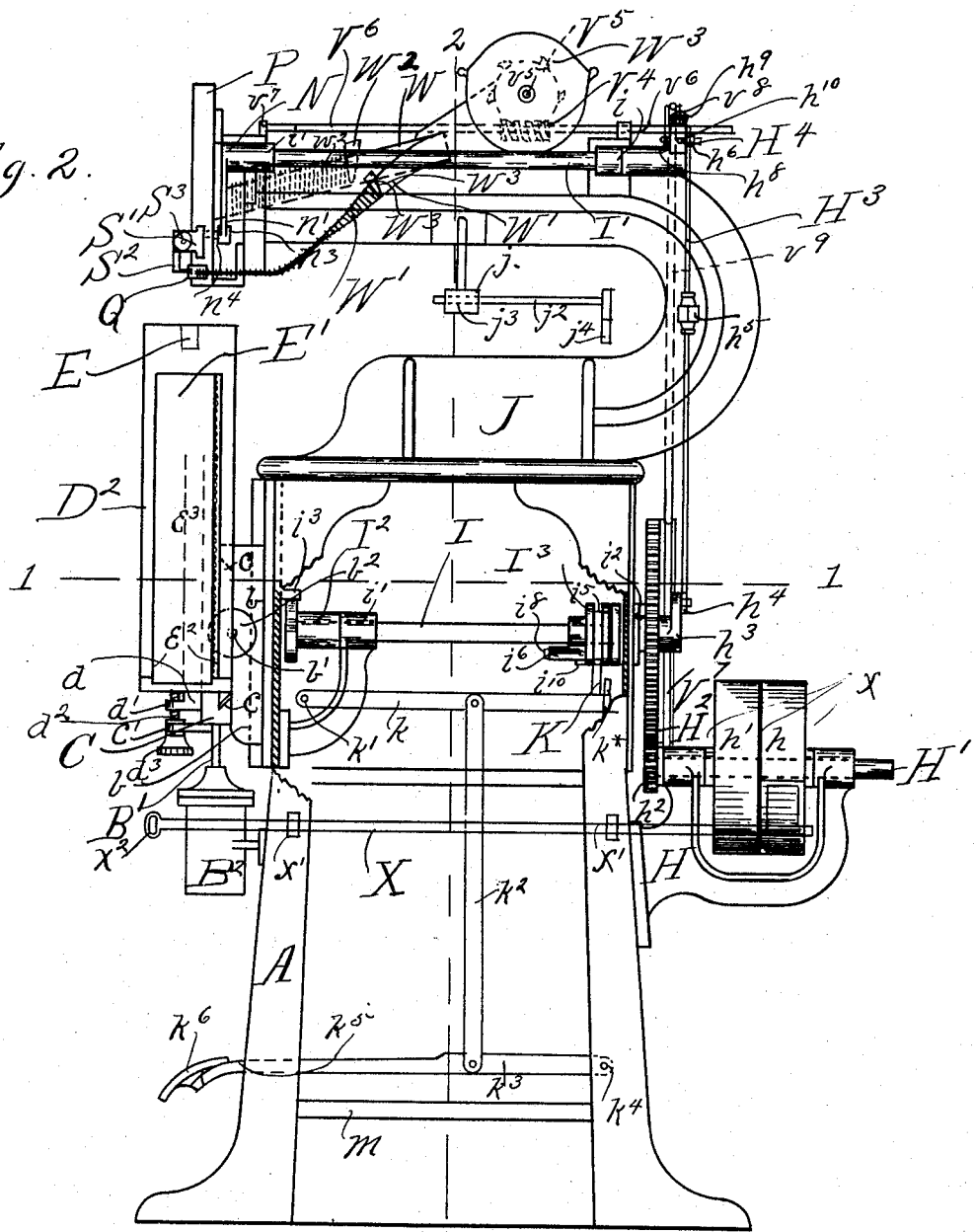

Figure 1 is a vertical elevation of the complete machine. Fig. 2 is a side elevation of Fig. 1. Fig. 3 is a detached detail of a wing of Fig. 1, partly broken away. Figs. 4 and 5 are broken vertical sections of Fig. 2, taken on the line 2 2 thereof looking forward. Fig. 6 is a similar view to Fig. 5 looking aft. Fig. 7 is an enlarged section view of Fig. 2, taken on the line 1 1. Fig. 8 is an enlarged view of a spur-wheel. Fig. 9 is an enlarged front broken view of a clutch of Fig. 7. Fig. 10 is a side view of a clamp attachment for holding box-covers and boxes. Fig. 11 is an enlarged view, in cross-section, of Fig. 12, taken on the line 3 3 thereof. Fig. 12 is an enlarged view of a portion of Fig. 1. Fig. 13 is a detail front view of part of Fig. 12. Fig. 14 is an enlarged cross-section of Fig. 12 on about the line 4 4 looking aft with the receiver removed. Fig. 15 is a front enlarged view of an impressor of Fig. 12, partly broken away. Fig. 16 is a cross-section of a movable feed factor or receiver, enlarged. Fig. 17 is a cross-section of another movable feed factor or receiver, enlarged. Fig. 18 is an enlarged perspective view of a cut-off. Fig. 19 is an end view of Fig. 15, partly in section, on the plane of the line 3 3 thereof. Fig. 20 is an enlarged view, partly in section, on about the line 4 4 of Fig. 12, showing staples in position on a conveyer. Fig. 21 is a front view of Fig. 15, partly in section. Fig. 22 is a plan view of a staple. Fig. 23 is an under side view, partly broken away, of Fig. 15. Fig. 24 is an enlarged top view of staple-pickers, and Fig. 25 is a partly broken and sectional view of the dash-pot of Fig. 1.

In the drawings, the letter A represents the base-casting or frame of the machine, to which is fitted a vertically-movable slide B to travel on guideways $b\ b$, an adjusting-screw $b'$ working in a nut $b^3$ on slide B and having a hand-wheel or head end $b^2$ connected therewith to operate said screw, being rotatably connected with a slide C, the slide C having guideways $c\ c$, whereby it is suppported movably by said slide B to be adjusted laterally thereof. Vertically carried in guides $d\ d$ on the slide C is a table-support D, a nut $d'$ on slide D receiving a screw $d^2$, having a head or its equivalent $d^3$, which screw $d^2$ is journaled in a bearing $c'$ on slide C, whereby the support D can be adjusted vertically with respect to slide C. At the side of the slides B C is an ordinary binding-clamp $c^2$, having a lever $c^3$ to hold the slide B in adjusted position with relation to the slide C.

The support D is provided with a head $D'$, preferably of the form and construction shown, which head $D'$ supports a table having leaves $D^2\ D^2$ set at right angles to each other and secured firmly to the head $D'$. Each of the said leaves of said table is provided with an anvil E, sunk with its face flush with said leaves $D^2$, and extending in and along each of said leaves is a recess $E'$, having at its inner and outer edges guides $e^2\ e^2$, on which are movably fitted slide-rests F, supporting turnably each a binding-screw $f$, having a head $f'$, said screw being adapted to bind against the side of said guide $e^2$ of the said leaves $D^2$. Extending along one edge of the recess $E'$ is a rigidly-secured rack $e^3$, adapted to mesh with which is a pinion (not shown) carried rigidly on a shaft $F'$, journaled in the slide-rest F, which shaft when revolved will, through the pinion and rack, cause the corresponding slide-rest F to be adjusted along its leaf $D^2$ when its clamp $f''$ is not bound against such leaf. In a hole $g'$ in each slide-rest F, extending on a line in the direction of the anvils E, is located a movable bar $g^2$, which is cushioned on a stiff spring $g^3$. Against the head $g^4$ of said bar $g^2$ impinges a cross plate or wing G, disposed at right angles to the longitudinal line of said table $D^2$, said plate or wing G being supported by a slide $q^5$, loosely engaging the guides $e^2$ and being adapted to self-center and accommodate itself according to the edge and width of the board it engages and supports by its play upon said guideway $e^2$.

Firmly secured to the slide B is a plunger-rod B', which passes into a dash-pot $B^2$, fastened securely to the casting A and having oil for a cushion. At the end of said plunger-rod B' is a head $b^3$, having a valve comprising a valve-plate $b^5$, passages $b^4$, and retainers $b^6$, to hold movably said valve-plate. This dash-pot is of the ordinary pattern.

A bracket H supports a shaft H', having an idle pulley $h$ and a pulley $h'$, the latter pulley being fixed to the shaft H', to which is also permanently secured a pinion $h^2$ in mesh with a gear $H^2$, fitted movably and adapted to rotate on the shaft I, journaled in bearings $i^2$ on frame A, which shaft also carries a crank $h^3$, rigidly secured to said shaft, whose wrist-pin $h^4$ is movably connected with a bi-part connecting-rod $H^3$, having an ordinary turnbuckle $h^5$ adjustably joining the two parts of said rod $H^3$, the other end of which rod is jointed to a slidable wrist-pin $h^6$, supported by a slide movable in a slot formed in a lever $H^4$. A screw $h^{10}$, journaled in said lever, engages threads carried by said slide to adjust the position of the said wrist-pin $h^6$, a head $h^9$, affixed to the end of said screw $h^{10}$, serving as a means for rotating the latter. A lock-nut or two, as shown, can be fitted to the end of said wrist-pin. A clamp $h^8$ secures the wrist-pin slide in any desired position of the slot. The said lever $H^4$ is in turn securely fastened to the end of a shaft I', which is journaled in bearings $i'$ of the arm J of the machine-frame. The shaft I has rigidly attached to it a cam $I^2$, adapted when rotated with the shaft to actuate the roller-pin $i^3$, projecting rigidly from a portion $i^4$ of the vertical slide B, to operate same along its slide on the machine-frame A. Upon the said shaft I is rigidly attached a wheel $I^3$, having an annular groove $i^5$. Extending from the side of said wheel $I^3$ is a boss $i^6$, having a groove $i^7$, passing in the direction of and into the path of the annular groove $i^5$. The groove $i^7$ carries a plunger $i^9$, which is held forward by a spring placed against the end thereof in the plunger-chamber, said spring being held adjustably in place by a nut $i^8$, as shown. The said plunger $i^9$ bears a lug $i^{10}$ which when said plunger is moved forward by its spring crosses the path of the said groove $i^5$ when unintercepted and unarrested by the release-block K, which is supported on a pivoted lever $k'$, as shown, and is located normally in the path of said groove $i^5$ and when in said normal position forces back the plunger $i^9$ by the lug $i^{10}$ gliding upon the incline $k^7$ of the said release-block K, which latter is connected with a lever $k$, movably secured at $k'$ to the frame A. A connecting-rod $k^2$ movably connects said lever $k$ to a lower lever $k^3$, pivoted at $k^4$ to the said frame A, and extends forwardly through said frame at $k^5$ and terminates in a tread $k^6$.

Secured to the gear $H^2$ and turnable independently therewith upon the shaft I is a spur-wheel L, having, preferably, three spurs, as shown, to coact with plunger $i^9$, whereby when the latter engages said wheel gear $H^2$ will be rotatively connected with shaft I in the nature of a clutch. When $K k^7$ withdraws the plunger from wheel H, said gear and shaft will be uncoupled.

M M M are stay-bolts to fasten the parts of the frame A together.

Carried on the forward end of the shaft I' is a bell-crank N, as shown, and secured to the forward end of the yoke-frame J is a head or casting having two extending portions O P, each having two guideways or grooves $o$ $o'$ and $p$ $p'$, the grooves $o$ $o'$ lying adjacent and parallel to each other and the guideways $p$ $p'$ lying adjacent and parallel to each other, the said sets of guideways being disposed at right angles to each other and intersecting at $o^2$ and $p^2$. The arm $n'$ of the bell-crank N is pivotally connected with a link $n^2$ at $n^3$, which link is turn in connected similarly by a pin $n^4$ with a slide-piece $S^2$, hereinafter termed an "impressing" or "driving" device, adapted to slide along and in the guideway $p$, and the arm $n$ is pivotally connected with a similar link, (shown by dotted position $o^2$ at $o^3$,) which link connects in turn similarly by a pin $o^4$ to a slide $o^5$, adapted to slide in a guideway $o$. The pin $o^4$ in connecting with its slide $o^5$ passes and has clearance through a slot $o^6$ in the said casting parallel with the said guideway $o$, and the pin $n^4$ passes freely through a similar slot $n^6$ to admit such pin through the casting of its slide, said slot $n^6$ being parallel to the said guideway $p$. Attached at $j'$ to the yoke J is a hanger $j$, which hanger supports slidably a gage-rod $j^2$, having a foot $j^4$ and adapted to be held securely in any set position by an ordinary clamp, as represented by $j^3$, said gage being set at any desired position to accommodate different length boards with respect to their correct or desired position with relation to the anvil E and the driving device, to be described presently. Secured also to the said yoke J is a slidable gage J', having a foot $j^5$ and a screw $j^7$ fitted turnably in a journal $j^8$ and engaging a nut or threads in the said gage J', the said screw $j^7$ having a head $j^9$ for turning it to adjust or gage the distance of said foot $j^5$ from the table to accommodate boards and boxes of different degrees of thickness and size. A block $j^6$ supports slidably said gage J' at the correct angle with relation to said table. The adjusting screw and slide of said gage is substantially similar to the screw adjustment $c'$ $d'$ of the table-slide D. As will be readily seen by reference to the drawings, the object of the adjustable wings G G is to permit the accommodation of boards of either matched or unmatched and of greatly different widths, as shown by the positions in which said wings are set with relation to said anvils E. The rectangular dotted lines $d^\# d^\#$ shown on the leaves of said table $D^2 D^2$ represent boards of unlike widths in position on the said leaves of said table. Said gage and the adjacent part $p^2$ of the head O P provide an abutment having an angular recess located above the apex of the table, into which recess and against which abutment angularly-disposed boards placed upon the table are raised and clamped by the table. When boards of varying thickness are placed upon the table, the upper edge of the top board varies more or less with respect to the angle of the recess of said abutment, and the lateral adjustability of the table provides for adjusting the upper edge of the top board so that said edge will properly enter the angle of said recess, and the varying thicknesses of boards can be accommodated between the parts J' $p^2$ owing to the vertical adjustability of the table and the relative adjustment of the gage J'. The foot $j^5$ provides an anvil to clench horizontally-driven staples.

Fitted slidably into the slots $o'$ $p'$ are the combined receivers and staple-guides Q' R', constructed with a channel $q$ $q'$ $r$ $r'$ to receive and guide said staples when being driven, the construction of the receiver R' being practically the same as that of the receiver Q' except that the latter is disposed at an angle with relation to said receiver R'. These receivers are both guided in their motion by the tongue-and-groove plan illustrated of receiver Q', in which the tongues $q^2$ $q^3$ fit freely into grooves formed along the corresponding surfaces of the receivers, and fitted into the grooves $o'$ $p'$ are stationary or fixed receivers Q R, formed similar in cross-section to the said receivers Q' R', except that the receivers Q R are each provided at their forward ends with a recess $q^4$, which opens into the channels $q$ $r$ and is of such shape as to freely receive a staple S from the ends $q^5$ of carriers W W', one of which projects through opening $q^4$, formed also in the arm of the casting O, to receive the same. In Fig. 2 the carrier W' is shown as twisted to properly guide staples to opening $q^4$. An opening similar to $q^4$ and for the same purpose is provided in the arm P, into which the other carrier leads.

Carried by each receiver Q' R' is a rack $Q^3$ $Q^4$, meshing with a pivoted rotatable gear $Q^5$, which is provided with lock-pins $Q^6$ and $Q^7$, over which-pins are adapted to alternately pass the lock-bars $Q^8$ $Q^9$, carried by the driver-blocks, which bars by means of their flared surfaces $Q^{10}$ $Q^{11}$ engage the pins $Q^6$ $Q^7$ alternately and rock gear $Q^5$, thereby alternately pushing said receivers toward and against boards on the table, and thus locking the receivers alternately in the pressing positions and preventing their return during the driving of a staple by their locking said gear-wheel $Q^5$. This action holds the staple-receivers as guides tight against the surface of the boards during driving and gives the great advantage of a continuous guide to the staple right up to the point of contact with the stock, which prevents the staple buckling in hard-wood driving, and permits of the use of lighter wire than can be used with short guides. Into the slot $q$ $q'$ of said receivers slidably fits a cut-off $Q^2$, having a contour $q^6$ adapted to fill and close the aperture of the slots $q$ $r$, said cut-offs being drawn to the forward position in the fixed receiver members by an actuating-spring $q^7$, attached at $q^8$ to said cut-off and at $q^9$ to another body under tension, and when in such position the cut-off $q^6$ fills the space between the end $q^5$ of the carriers W W' and the groove $q'$ of the receiver members, thus cutting off or stopping the entrance of staples to the slot $q$. This cut-off is drawn forward by its spring when the movable receiver Q' R' and the associate impressor moves forward, and since the forward end of the cut-off $Q^2$ is in contact when the impressor or driver is back with the heel of the impressor T and follows the latter in the same groove during its forward movement (after the impressor has pushed a staple from the free end $q^5$ of the carrier W or W' along the groove which the impressor itself then fills) it results that as the cut-off follows the heel of the impressor it stops another staple from feeding into the receiver-groove until the impressor in its return travel forces back the cut-off and the head $t^2$ of the impressor reaches a position to one side of the carrier back of the head of a staple in position to drive it forward. The cut-off then acts as a follower along the groove $q^5$ at the heel of the impressor.

In each of the guideways $o$ $p$ is slidably fitted a driving or impressing device having a body S', which is held slidably and properly in position in said guideways by means of the tongues $s$ $s$, fitting into the said guideways in the ordinary manner. Adjustably secured to said body S' is a driving or impressing block $S^2$, having tongue-and-groove connection therewith, Fig. 21. A screw $s'$, entering $S^2$ and passing through a slot in S', holds parts S' and $S^2$ together. (See Fig. 15.) A regulating-screw $S^3$, carried by said body S' and threaded through same at $S^4$, impinges at $S^7$ against body $S^2$. A split in said body S', as at $S^6$, in conjunction with a screw $S^5$, permits said screws $S^3$ when properly set to be clamped securely in set position by the clamp-screw $s^5$. Attached to said driving-block $S^2$ is a driver or impressor T, which is secured in position on the driving-block $S^2$ by the screws $t$ and the tongue and groove $t'$ and is adapted to slide to and from the anvils in slots $q$ $q'$ and the end of the said driver T being concave, as at $t^2$, corresponding to the rounded head of the staples, against which it exerts its driving force.

Motion is imparted to the driving body S' and to the similar driving body T', having an impressor or driver similar to T and working in the slots $r\ r'$ by means of the links $o^3\ n^2$, connecting their respective arms $n\ n'$ of the bell-crank N to said driving bodies S' T' by means of their pins $O^4$ and $n^4$, fitting into threaded holes, (designated by $n^4$ also.)

The construction and operation of both sets of driving-blocks, drivers, and movable and stationary receivers is the same.

An attachment for holding the boards or flanged box-covers and boxes may be provided and connected with the slide-rest $g^5$ of and in place of the wing G by pivotally fastening a stay-block U by means of a pivot $u$ passing through same and through a head $u'$, fastened securely in place on said slide-rest $g^5$. (See Fig. 10.) The said stay-block U supports slidably a rod U', which is adjustable in said stay-block U by means of a binding-screw $u^2$. At one end the said rod has securely fastened to it a head $U^2$ which pivotally and adjustably supports a foot $U^3$ at $u^4$, shaped at its lower end $u^5$ so as to fit closely against and in the corner of a box-cover placed on said anvil to securely hold same in place during the driving of staples therein. The said foot $U^3$ is adjustable with relation to said head $U^2$ by a screw $u^6$, turnably supported and threaded in said head at $u^7$ and impinging against the heel of said foot $U^3$, as shown.

Supported on the machine-frame J are two staple-supply receptacles formed into a V shape, as shown in cross-section, (see Fig. 24,) to cause the staples placed within said receptacles to converge and impinge against the hooked spurs $v\ v$ of the selectors or pickers $V^3$, which are securely fastened to a revoluble shaft $v^5$, journaled through said receptacles and fitted with a worm-wheel $V^5$, engaging a worm $V^4$, secured to a shaft $V^6$, journaled at $v^6\ v^7$ and fitted with a driving-wheel $v^8$, driven by a belt $v^9$, which is adapted to be run upon and by a wheel $V^7$, secured to the gear-wheel $H^2$ or the shaft thereof.

Secured to the receptacles V are the carriers W W', which consist of strips of approximately flat metal running from said receptacles V into the slots at $w\ w'$, the latter slot being marked slot $q^4$, to receive the staples from the selectors or pickers V to deliver them thereby through the slots of the receivers Q R, from which the staples pass into the respective receivers Q' R', some of the staples during their said conveyance being represented by $w^2\ w^3$. A weight $W^2\ W^3$, which may be shifted by hand from time to time, is placed on said carriers back of a feeding quantity of said staples to assist their gravity feeding along said carriers toward and into the aforesaid receivers.

On the casting A a belt-shifter consisting of the ordinary rod X and the guides $x\ x$ over the belt is supported by bearings $x'\ x'$ and is provided with a handle $x^2$ for shifting the belt (unshown) from the idle to the active pulley, and vice versa, in the ordinary manner to start or stop the machine.

In the operation of said machine, which is connected to a belt-power transmission by means of the pulleys $h\ h'$, the aforesaid gages are first all set to accommodate the desired length, width, and thickness of boards that it is desired to hinge together with interlocked staples, which gages can also accommodate flanges, box-covers, and box parts to be hinged to boxes, the staples being in position on their feed guides or carriers and receivers ready to be driven into the boards and clenched against the anvils. The belt being shifted to pulley $h'$, the shaft H' and its pinion $h^2$ cause the gear $H^2$ to revolve, and thereby the spur-wheel L is rotated. A depression now made on the tread $k^6$ by the foot draws down the lever $k$, and thus the release K of the lever $k^\#$ is withdrawn from plunger $i^9$, thereby allowing the end of the plunger, through the action of its spring, to pass into the path of the spurs of the wheel L. The spur $i$, which then impinges on said plunger, causes the grooved wheel $I^3$ to revolve, and thus rotate the shaft I, to which it is securely fastened, which action simultaneously causes the cam $I^2$ and the crank $h^3$ to rotate and through said cam to raise the table of the machine and through the connecting-rod $H^3$ to operate the upper or feeding and driving devices of the machine. While the mechanism is in motion the pressure is raised from the tread $k^6$, and the mechanism is brought to rest after one rotation of shaft I by the release-block K moving into the groove $i^5$ of the wheel $I^3$, so that when the lug $i^{10}$ rides up the inclined face $k^7$ of said release K the plunger will be withdrawn from contact with the spur of the spur-wheel L; but while shaft I is rotating the table carries upward against the aforesaid staple-driving mechanism at $p^2$ and the gage J' the boards or parts of boxes $d''$ placed on said table to receive the staples from said driving mechanism, and while the table is retained in the raised position by its cam the connecting-rod $H^3$, through the lever $H^4$ and shaft I', oscillates the bell-crank N and imparts an alternate to-and-fro motion to the links $n^6\ o^2$ and the slides or impressors $o^5\ n^5$. During this action the wheel $V^7$, through the belt $V^9$ and the pulley $v^8$, rotates the shaft $V^6$, and its worm $V^4$ in turn rotates the worm-wheel $V^5$ and the shaft $v^6$, which imparts motion to the pickers or selectors $V^3$, which (receptacles V being previously supplied with staples) by the passing of their spurs $V^3\ V^4$ through the mass of said staples pick up staples and carry them up and over and deliver said staples upon the carriers W W', which carriers then by gravity and by the employment of the weight as aforesaid guide and deliver the staples to the aforesaid receivers. The table being held raised and the bell-crank N rocked, as stated, the arms $n$ $n'$ alternately move toward and from the impressing or driving point $p^2$ to operate the staple-drivers to drive staples into the box parts on the table alternately. The staples in one receiver are disposed at right angles to the staples in the other receiver, so that when one staple is driven from one receiver another staple will be driven through the loop of the first staple, whereby said two staples will be interlocked with one another, constituting a staple-hinge.

As will be understood by referring to the drawings, the action of the driver and the respective movable feed members toward the impressing-point, which is alternate and similar, is as follows: The driver or impressor T' first descends, and the driver S' S² recedes from the positions shown in Figs. 1 and 12, and the receiver member R' is pressed upon the board at the left, the vertically-disposed staples being then driven. During the descent of R' the gear $Q^5$ pushes Q' to the right, and said gear is locked by pin $Q^6$. Parts T' and R' next rise, Q' is advanced and pressed upon the right-hand board, and $Q^5$ is locked by pin $Q^7$, and thereupon the impressor S' S² carries forward the staple in the guide-groove $q'$ of the movable feed member Q', a continuous guide for the staple being provided, which prevents its buckling and enables the stapling of hard-wood boards. The staple driven by S' interlocks with the staple driven by T', forming one hinge, and then the table and drivers come to rest, owing to the previous uncoupling of shaft I from gear H². The box parts are next adjusted along the table in position for another hinge, the treadle $K^6$ is again depressed, shaft I again coupled to gear H², the table rises, and another hinge is applied by the drivers. Thus one, two, or more hinges may be applied to a box by adjusting the box parts on the table. As gear H² may continuously revolve, (shaft I having intermittent rotation,) the staple selecting and feeding devices may continue to pick up and supply staples to the carriers or tracks.

Instead of the two staple-receptacles and spur-wheels being employed it is of course possible to employ but one for such purpose, with a switch running therefrom, which can deliver staples to either carrier to which the operator or the movement of the mechanism may set the switch.

If the staples become bunched or crossed as they are picked up by the teeth of the spur-wheels, they bind upon the delivery or gliding surface of said spurs, and thereby prevent their even gravity slide onto the end of the carrier adjacent thereto, and when the spur so holding them has passed the end of said carrier and is at greater inclination the said bunched or crossed staples slide off said gliding surface of the spur back into the said receptacle; but all staples properly picked by said spurs glide freely therefrom when at the proper inclination onto the end of said carrier.

I am of course aware that this invention can be constructed in many different ways comprising various modifications of the plans herein set forth without departure from the principle involved therein. I therefore do not limit my invention to the details shown and described.

What I claim is—

1. A machine of the character described comprising staple-carriers, a staple-impressing device having a plurality of impressors and a plurality of members movably connected together and actuated with said impressors, said carriers leading to said members to deliver staples thereto, said impressors being disposed at an angle with relation to each other, means to clench the points of an impressed staple, a gage against which boards may be clamped, and means supporting said gage to permit it to have adjustment vertically and laterally with respect to boards, substantially as described.

2. A machine of the character described comprising staple-carriers, a staple-impressing device, guideways therefor, said guideways each comprising a stationary member and a movable member, said movable members having movement toward the impression-point coincident with the movement of the associate impressing member, said carriers leading to the guideways to deliver staples thereto, means to clench the points of an impressed staple, a gage against which boards may be clamped, means supporting said gage to permit it to have adjustment vertically and laterally with respect to boards, and means to operate said machine, substantially as described.

3. A machine of the character described comprising a staple-carrier, a staple-impressor, a guideway therefor comprising a stationary member and a movable member supported in alinement, said movable member having movement toward the impression-point coincident with the movement of said impressor, said carrier leading to said stationary member to deliver staples thereto, means to clench the point of an impressed staple, a gage against which boards may be clamped, means supporting said gage to permit it to have adjustment vertically and laterally with respect to boards, and means for operating said impressor and said movable member, substantially as described.

4. A machine of the character described, comprising a staple-impressing device, guideways therefor, the said guideways comprising double guides arranged parallel to each other, a staple-impressor in one of said guideways, a movable staple-feed member in the other of said guideways, and means to move said member toward the staple-impressing point coincident with the movement of said impressing member, means to cause said impressor to drive a staple, and means to operate said machine, substantially as set forth.

5. A machine of the character described, comprising a staple-impressing device, guideways therefor, the said guideways comprising double guides arranged parallel to each other, a staple-impressor in one of said guideways, a movable staple-feed member in the other of said guideways, said member having a groove, and means to move said member toward the staple-impressing point coincident with the movement of said impressing member, means to feed staples into said groove in said movable member, said impressor being arranged to move staples from said groove to impress them in stock, and means to operate said machine, substantially as set forth.

6. A machine of the character described, comprising a staple-impressing device, guideways therefor, the said guideways comprising double guides arranged parallel to each other, a staple-impressor in one of said guideways, a movable staple-feed member in the other of said guideways, means to move said member toward the staple-impressing point coincident with the movement of said impressing member, and means to operate said machine, substantially as set forth.

7. A machine of the character described, comprising a staple-impressing device, guideways therefor, the said guideways comprising double guides arranged parallel to each other, a staple-impressor in one of said guideways, a movable staple-feed member in the other of said guideways, means to move said member toward the staple-impressing point coincident with the movement of said impressing member, a lock to hold said movable feed member at the extremity of its forward movement while the staple is being impressed, and means to operate said machine, substantially as set forth.

8. A machine of the character described, comprising a staple-impressing device, guideways therefor, the said guideways having a plurality of impressors, said impressors being disposed at an angle with relation to each other, the said guideways comprising double guides arranged parallel to each other, a staple-impressor movable in one of said guideways, and a movable feed member movable in the other of said guideways, means whereby the said movable feed member is moved toward the staple-impressing point coincident with the motion of its impressor, means to lock said movable feed member at the extremity of its movement during the impression of staples, means to release said member, one impression member and its movable feed member having movable connection with the other movable feed member and impressor, means to automatically operate said members, a table for box parts, means to move said table and said member toward each other, and means to operate said machine, substantially as set forth.

9. A machine of the character described, comprising a staple-impressing device, guideways therefor, the said guideways having a plurality of impressors, said impressors being disposed at an angle with relation to each other, the said guideways comprising double guides arranged parallel to each other, a staple-impressor movable in one of said guideways, and a movable feed member movable in the other of said guideways, means whereby the said movable feed member is moved toward the staple-impressing point coincident with the motion of its impressor, means to lock said movable feed member at the extremity of its movement during the impression of staples, means to release said member, one impression member and its movable feed member having movable connection with the other movable feed member and impressor, the said movable feed members having each a rack connected with a gear, an anvil constituting a clench-block adapted to clench the points of an impressed staple, means to impart a coincident motion between said impressor member and said anvil, and means to operate said machine, substantially as set forth.

10. A machine of the character described, comprising a staple-carrier, means to operate the machine, staple-impressing members, a plurality of stationary members, and a plurality of movable staple-feed members, disposed at an angle to each other, said movable members each having a groove, said impressing members being movable in the corresponding grooves in said staple-feed members, and a cut-off movable in said stationary members to intermittently stop the feeding of staples from the carrier substantially as set forth.

11. A machine of the character described comprising a staple-carrier, staple-impressing members, a stationary and a movable staple-feed member having a groove formed therein, said impressing member being movable in said groove in said staple-feed members, and a cut-off movable in one of said feed members to intermittently stop the feeding of said staples from the carrier, said cut-off comprising a body movable in and out of the path of said carrier coincident with the movement of the impression members, substantially as set forth.

12. A machine of the character described, comprising a staple-carrier, staple-impressing members, a stationary and a movable staple-feed member, said impressing member being movable in a groove in said staple-feed members, a cut-off movable in one of said feed members to intermittently stop the feeding of staples from the carrier, said cut-off comprising a body movable in and out of the path of said carrier coincident with the movement of said impression member, a tension device to actuate said cut-off, and means to return said cut-off with the return of said impressing member, substantially as set forth.

13. A machine of the character described comprising a staple-carrier, a movable feed member, means to actuate the movable member, and a lock for locking said movable member in its forward position during the driving of a staple therefrom, substantially as set forth.

14. A machine of the character described, comprising a staple-feed mechanism, means to operate same, an impressing mechanism having a member comprising two parts adjustable in the direction of their travel with relation to each other, and means to operate said member, substantially as set forth.

15. A machine of the character described, comprising a staple-feed mechanism, and means to operate same, an impressing mechanism having impressing members, means to operate same, said members comprising a main actuated body and a secondary body, said bodies being adjustable in the direction of their travel with relation to each other, and adjusting means comprising a screw, carried by one of said bodies and movably engaging the other of said bodies, substantially as set forth.

16. A machine of the character described, comprising a staple-feed mechanism, and means to operate same, an impressing mechanism having impressing members, means to operate same, said members comprising a main actuated body and a secondary body, said bodies being adjustable in the direction of their travel with relation to each other, and adjusting means, comprising a screw, carried by one of said bodies and movably engaging the other of said bodies, and means whereby said bodies are securely and adjustably bound together, substantially as set forth.

17. A machine of the character described, comprising sets of staple-impressing and staple-feeding members and having mechanism to actuate said sets of members alternately to and from the staple-impression point, means to lock said feeding members alternately in impression position, and means to release said members alternately from said position and from said lock, in combination with staple-carriers leading to the feeding members, means for picking staples from a mass and transferring them to said carriers, and means for operating the staple-pickers independently of the impressing members, substantially as set forth.

18. A machine of the character described, comprising means for feeding staples, means for impressing staples, a table having an anvil, said anvil constituting a clench-block, means for causing the impressing means and the table to have movement toward and from each other, means for automatically starting and stopping the table-operating means and the impressor, guides to direct the movement of said table, a rotatable body to impart movement to said table, and a catch and release arranged between said rotatable body and an actuating means, substantially as set forth.

19. A machine of the character described, comprising means for feeding staples, means for impressing staples, a table having an anvil, said anvil constituting a clench-block, means for causing the impressing means and the table to have movement toward and from each other, means for automatically starting and stopping the table-operating means and the impressor, guides to direct the movement of said table, a rotatable body to impart movement to said table, a catch and release arranged between said rotatable body and an actuating means, and a cam carried by said rotatable body, said cam having movable connection with said table, substantially as set forth.

20. A machine of the character described, comprising means for feeding staples, means for impressing staples, a table having an anvil, said anvil constituting a clench-block, means for causing the impressing means to have movement toward the table, means for automatically starting and stopping the impressor, guides to direct the movement of said table, a rotatable body to impart movement to said table, a catch and release arranged in connection with said rotatable body, a cam connected with said rotatable body, said cam having movable connection with said table, said table having a vertically-disposed guideway, and a projection carried by said table, said projection having movable connection with and operated by said cam, substantially as set forth.

21. A machine of the character described, comprising means for feeding staples, means for impressing staples, a table, means for causing the impressing means to have movement toward the table, means for automatically starting and stopping the impressor, guides to direct the movement of said table, a rotatable body to impart movement to said table, and a catch and a release arranged in connection with said rotatable body, a cam carried by said rotatable body, a projection carried by said table, said projection having movable connection with and operated by said cam, the said catch constituting a clutch carried between and alternately connecting and releasing said rotatable body and a power driving device, and means to actuate at will said clutch, substantially as set forth.

22. A machine of the character described, comprising means for feeding staples, means for impressing staples, means for operating the impressing means, means for automatically starting and stopping the impressor, a table, guides to direct the movement of said table, a rotatable body to impart movement to said table, a cam carried by said rotatable body, said cam having movable connection with said table, a clutch carried between and alternately connecting and releasing said rotatable body and a power driving device, and comprising a body carried by said power driving device, said body being turnable independently of said rotatable body, a spur carried by said independently-turnable body, and a plunger carried by said rotatable body, said plunger having movement across the path of movement of said spur to engage and release same during movement of said power driving device, substantially as set forth.

23. A machine of the character described comprising means for picking staples, means for feeding staples, means for impressing staples, a table, guides to direct the movement of said table, a rotatable body to impart movement to said table, a cam having movable connection with said table and carried by said rotatable body, a clutch carried between and alternately connecting and releasing said rotatable body and a power driving device, said clutch comprising a member carried by said power driving device and rotative independently of said rotatable body, a spur carried by said member, a plunger carried by said rotatable body, said plunger having movement across the path of movement of said spur to engage and release same during movement of said member, a release to automatically force said plunger out of the path of the spur of said member, a spring to actuate said plunger, a lug on said plunger, said release having an inclined surface to actuate said lug, and means to operate the release, substantially as described.

24. A machine of the character described, comprising means for feeding staples, staple-carriers leading thereto, means for placing staples upon the carriers means for impressing staples, a table, means for causing the impressing means and the table to have movement toward and from each other, means for automatically starting and stopping the table-operating means and the impressor, power driving mechanism to operate said machine, a crank connected with and rotated by said driving mechanism, a rock-shaft turnable with relation to the movement of said driving mechanism to operate said staple-impressing mechanism, and a movable connection between said shaft and said driving mechanism, substantially as set forth.

25. A machine of the character described, comprising means for feeding staples, means for impressing staples, a table having an anvil, said anvil constituting a clench-block, means for causing the impressing means and the table to have movement toward and from each other, means for automatically starting and stopping the table-operating means and the impressor, power driving mechanism to operate said machine, a crank connected with and rotated by said driving mechanism, a rock-shaft turnable with relation to the movement of said driving mechanism to operate said staple-impressing mechanism, a movable connection between said shaft and said driving mechanism, said movable connection comprising a connecting-rod and a turnbuckle, a lever carried by said rock-shaft, a slide in connection with said rod and said lever, and a screw to adjust said slide on said lever, substantially as set forth.

26. A machine of the character described, comprising means for picking staples, means for feeding staples, means for impressing staples, a table having an anvil, said anvil constituting a clench-block, means for causing the impressing means and the table to have movement toward and from each other, means for automatically starting and stopping the table-operating means and the impressor, power driving mechanism to operate said machine, a crank connected with and rotated by said driving mechanism, a rock-shaft turnable with relation to the movement of said driving mechanism to operate said staple-impressing mechanism, a movable connection between said shaft and said driving mechanism, said movable connection comprising a connecting-rod and a turnbuckle, a lever carried by said rock-shaft connected with said rod, a bell-crank carried by said shaft, and a movable connection formed between a staple-impressing mechanism and each respective arm of said bell-crank to alternately move the staple-impressors to and from the impressing-point, substantially as set forth.

27. In a machine of the character described the combination of staple-picking devices, staple-driving devices, carriers leading from the picking to the driving devices, a driving member, means for operating the picking devices continuously by the driving member, and means detachably connecting the driving member with the staple-driving devices for permitting said driving devices to be intermittently operated by said member while the picking devices continue to operate, substantially as set forth.

28. In a machine of the character described the combination of staple-picking devices, staple-driving devices, carriers leading from the picking to the driving devices, a table to receive box parts, a driving member, means for operating the picking devices continuously by the driving member, means for operating the table, and means detachably connecting the staple-driving devices and the table-operating means with said driving member for causing the table and the staple-driving devices to operate intermittently while the picking devices continue to operate, substantially as set forth.

29. In a machine of the character described the combination of staple-picking devices, staple-driving devices, a carrier leading from the picking to the driving devices, a table to receive box parts, a rotative element, means connecting the same with the staple-driving devices and with the table for operating them, a driving member, means connecting said member with the picking devices, and means for detachably connecting said rotative element with said driving member for causing the driving devices and the table to be operated intermittently while the picking devices may be operated continuously, substantially as set forth.

30. In a machine of the character described the combination of staple-picking devices, staple-driving devices, carriers leading from the picking to the driving devices, a table to receive box parts, a shaft, a cam for operating the table by said shaft, connections between said shaft and the staple-driving devices for operating the latter, a driving member rotative independently of said shaft and connected with the picking devices, and a clutch adapted to connect said shaft with said driving member to cause said shaft to operate the table and the staple-driving devices intermittently while the picking devices may be operated continuously by said driving member, substantially as set forth.

31. In a machine of the character described the combination of staple-picking devices, staple-driving devices, tracks leading from the picking devices to the driving devices, a table to receive box parts, means for bringing the box parts and the driving devices together, and means for operating the driving devices with an adjustable gage above the table to aline with one of the driving devices and against which boards may be clamped by the table, substantially as set forth.

32. In a machine of the character described the combination of staple-picking devices, tracks leading therefrom to carry staples, staple-driving devices to which the tracks lead, said staple-driving devices having a plurality of movable members to receive staples and to be pressed against box parts, said drivers and movable members being disposed at an angle to each other, means for operating said movable members with the associate drivers, means to support box parts adjacent to the drivers, and means to move the box parts and the drivers toward each other, substantially as set forth.

33. In a machine of the character described the combination of staple-picking devices, tracks leading therefrom to carry staples, staple-driving devices to which the tracks lead, said staple-driving devices having a plurality of drivers and a plurality of movable members to receive staples from the tracks and to be pressed against box parts, said drivers and movable members being disposed at an angle to each other, means for operating said movable members with the associate drivers, means to intermittently operate said drivers, and means to continuously operate the staple-picking devices, substantially as set forth.

34. The combination of staple-picking devices, tracks leading therefrom to carry staples, staple-driving devices to which the tracks lead, guideways to receive the staples, said guideways each comprising a stationary and a movable member, located at an angle to each other, the movable members having movement toward the staple-impression point, the staple-drivers associated with each movable member having movement coincident therewith, a table to support box parts adjacent to the drivers, and means for clenching staples, substantially as set forth.

35. The combination of staple-picking devices, tracks leading therefrom to carry staples, staple-driving devices to which the tracks lead, guideways to receive the staples, said guideways each comprising a stationary and a movable member, the movable members having movement toward the staple-impression point, the staple-drivers associated with each movable member having movement coincident therewith, a table to support box parts adjacent to the drivers, means for clenching staples, means to intermittently operate said table and said driving devices, and means to continuously operate the staple-picking devices, substantially as set forth.

36. The combination of a table to hold box parts, staple-guideways each having a movable member adapted to be moved toward the box parts, a staple-driver for each guideway, means to move each movable member toward a box coincident with the corresponding movements of its associate driver, and an adjustable gage above the table to aline with one of the feed members and against which boards may be clamped by the table, means for selecting and feeding staples, and tracks leading therefrom to said guideways respectively, substantially as set forth.

37. The combination of a table to receive box parts, a pair of guideways for staples, each guideway having a movable member, tracks to deliver staples to the guideways, a driver for each guideway adapted to drive staples from the corresponding movable member, means connecting said movable members together to simultaneously move them in opposite directions, and means connected with each driver to operate and lock the movable-member-operating means, substantially as set forth.

38. In a machine of the character described the combination of a pair of movable staple-feed members carried in guides arranged at an angle to each other, means for supplying staples to said members, means for driving staples from said members, a rotary body connected with said members to reciprocate them, means for operating said body coincidently with the movement of the staple-driving means, and means for locking said body to hold the movable members in their forward position of adjustment during the staple-driving operation, substantially as set forth.

39. In a machine of the character described, the combination of a frame provided with a rigid head having guideways disposed at right angles to each other, staple-driving devices mounted to reciprocate upon said head and located in said guideways and comprising a pair of drivers and a pair of movable staple-feed members having grooves to receive staples, means to operate said drivers, a table to receive box parts, and an adjustable gage above the table to aline with one of the feed members and against which boards may be clamped by the table, substantially as set forth.

40. The combination of a table to receive box parts, a staple-guideway above the same, a driver to drive staples from said guideway, a support for the driver, means to adjust the driver with respect to its support, a track for staples leading to said guideway, a follower behind the driver to retain staples on the track after the driver passes the track, and means for feeding staples to the track, substantially as set forth.

41. The combination of a table, means for operating the same, a head above the table provided with a pair of guideways, the table having a staple-clenching portion opposite one guideway, an anvil above the table opposite the other guideway, means for adjusting said anvil to accommodate boards of different thickness, tracks to conduct staples to said guideways, and means to successively drive staples from each guideway, substantially as set forth.

42. The combination of a main frame, a table guided vertically thereby, a shaft, means for raising the table by said shaft, a gear rotated independently of the shaft, a clutch, means for operating the same for connecting the shaft and gear operatively, a plurality of staple-driving devices above the table, a shaft connected with said devices for operating the same, and means connecting said shaft with said gear, whereby when the clutch is operated the table will rise and the staple-driving devices will operate successively to drive staples in boards on said table, and an adjustable gage above the table to aline with one of the feed members and against which boards may be clamped by the table, substantially as set forth.

43. A machine of the character described comprising a movable staple-feed member, a driver, an oscillatory member connected with said feed member, and means for operating said oscillatory member by said driver, substantially as described.

44. A machine of the character described comprising movable feed members located at an angle to each other, drivers to act with said members, an oscillatory member movably connected with said feed members, and means for oscillating said member by and during the reciprocations of said drivers to move the feed members toward and from the staple-impressing point, substantially as described.

45. A machine of the character described comprising movable feed members located at an angle to each other, drivers to act with said members, an oscillatory member movably connected with said feed members, and bars connected with said drivers having faces to engage extensions on said oscillatory member to rock said member to move the feed members toward and from the impressing-point, substantially as described.

46. In a machine of the character described, the combination of a frame, a vertically-movable slide guided thereby, means to operate the same, a table, means adjustably connecting said table with said slide to permit the table to be adjusted vertically and laterally with respect to said slide, and an abutment and adjustable gage above the table whereby the table may be adjusted to different positions for clamping boards of various thickness between the table and said abutment and gage, substantially as set forth.

47. In a machine of the character described, the combination of a head and an adjustable gage maintained adjacent thereto providing an abutment against which boards may be clamped, with a table beneath said abutment, means for raising and lowering the table, and means to permit the table to be adjusted vertically and laterally with respect to said abutment to accommodate boards of different thickness, substantially as set forth.

48. The combination of a frame, a head carried thereby, an adjustable gage located adjacent to said head, said head and gage providing a recessed abutment of angular form having one side adjustable, a table beneath said abutment having an angular form with its apex pointing toward the recess of said abutment, and means for adjusting the table vertically and laterally with respect to said abutment to accommodate boards of different thickness, substantially as described.

49. The combination of a frame having a head, staple-driving devices carried thereby and disposed at an angle to each other, and an adjustable gage supported adjacent to said head and having a portion adapted to aline with part of said driving devices to serve as an anvil for clenching staples, with a table to support boards beneath said head, and means for causing boards to be clamped between said table and said gage, substantially as described.

50. The combination of a frame, a head carried thereby, an adjustable gage located adjacent to said head, said head and gage providing an abutment of angular form having one side adjustable, a vertically-movable slide guided by said frame, means to operate the slide, a transversely-adjustable slide connected with the first-named slide, a table beneath said abutment, guides for connecting the table with the transversely-adjustable slide, and means to lock the parts in adjusted position, substantially as set forth.

51. In a machine of the character described, the combination of a frame, a vertically-movable slide guided thereby, means to operate said slide, a transversely-adjustable slide guided on the first-named slide, means to secure said slides together in adjusted positions, a vertically-movable table guided by said transversely-adjustable slide, means for adjusting said table to, and holding it in, different positions of vertical adjustment, and an abutment and adjustable gage above said table, whereby boards of different thickness may be clamped between the table and said abutment, substantially as set forth.

52. The combination of a frame having a head provided with a surface located at an angle to the vertical and an adjustable gage located adjacent to said head having a surface located at an angle to said surface of said head forming a recessed abutment to receive boards, with a table of angular form having the apex pointed upwardly and located beneath said abutment, means to operate said table, and means for adjusting said table to, and holding it in, different vertical and transverse positions with respect to said abutment, substantially as set forth.

53. In a machine of the character described, the combination of a table having angular form with the apex pointed upwardly, an abutment for boards above the apex of the table provided with a member adjustable toward and from the table, means for moving the table toward and from the abutment to clamp boards and box parts therebetween, and means for adjusting said table to, and holding it in, different vertical and lateral positions with respect to said abutment, substantially as set forth.

54. The combination of a table having angular form, an abutment for boards opposed to the table, means for operating the table to clamp boards against said abutment, gages for boards carried by the leaves of said table, means to permit adjustment of said gages along said leaves, spring-pressed pins against which said leaves bear, and means for holding said pins upon the leaves and adjusting them along the latter, substantially as set forth.

55. The combination of a table having leaves, an abutment opposed to the table, wing-gages loosely mounted upon the leaves of said table, slides adjustable along said leaves, means for adjusting and holding said slides, and spring-pressed pins interposed between said slides and said gages adapted to permit said gages to have oscillatory movement with respect to said leaves to accommodate boards of varying shapes, substantially as set forth.

56. The combination of a table to receive box parts, and an arm movably connected therewith and having an anvil adapted to enter a box part and bear against the same, substantially as set forth.

57. The combination of a table to receive box parts, and an arm movably connected therewith and having an anvil adapted to enter a box part and bear against the same, said anvil being adjustably connected with said arm, substantially as set forth.

58. The combination of a table to receive box parts, a slide adjustable along said table, an arm pivotally connected with said slide, and an anvil movably connected with said arm, whereby the anvil may enter and bear upon box parts of varying dimensions, substantially as set forth.

59. The combination of a table having sides disposed at substantially right angles to each other, with the apex pointing upwardly, an arm movably supported upon one of said sides and extending upwardly along said side, with an anvil located near the upper end of said arm above the point of connection of said arm with the table, whereby the arm may extend over the box parts on the table to enable the anvil to bear against the inner side of an outwardly-extending wall of a box part, substantially as described.

60. The combination of a frame, a vertically-movable slide guided thereby, means to operate the same, a transversely-adjustable slide connected with the first-named slide, a table and guides for connecting the same with the transversely-adjustable slide, means to lock the parts in adjusted positions, a gage above the table, and staple-driving devices above said table whereby said table may be adjusted vertically and laterally with respect to the staple-driving devices to accommodate boards of different dimensions between the table and the staple-driving devices, substantially as set forth.

Signed at New York, in the county of New York and State of New York, this 16th day of May, A. D. 1902.

WILLIAM McMURRAY.

Witnesses:
 STEWARD A. NICHOLAS,
 ANTON FUCHS.